US012434497B2

(12) United States Patent
Wang

(10) Patent No.: US 12,434,497 B2
(45) Date of Patent: Oct. 7, 2025

(54) APPARATUS FOR CODE SPRAYING ON TAPE AND REEL

(71) Applicant: Dongguan Jiezhan Precision Equipment Co., Ltd, Guangdong (CN)

(72) Inventor: Xingke Wang, Guangdong (CN)

(73) Assignee: Dongguan Jiezhan Precision Equipment Co., Ltd, Dongguan (CN)

( * ) Notice: Subject to any disclaimer, the term of this patent is extended or adjusted under 35 U.S.C. 154(b) by 177 days.

(21) Appl. No.: 18/221,907

(22) Filed: Jul. 14, 2023

(65) Prior Publication Data

US 2024/0326486 A1 Oct. 3, 2024

(30) Foreign Application Priority Data

Mar. 29, 2023 (CN) ......................... 202320666069.2

(51) Int. Cl.

*B41J 15/16* (2006.01)
*B41J 3/407* (2006.01)
*B41J 3/54* (2006.01)
*B41J 3/62* (2006.01)

(52) U.S. Cl.

CPC ............ *B41J 15/16* (2013.01); *B41J 3/4076* (2013.01); *B41J 3/407* (2013.01); *B41J 3/4071* (2013.01); *B41J 3/4073* (2013.01); *B41J 3/40731* (2020.08); *B41J 3/40733* (2020.08); *B41J 3/4075* (2013.01); *B41J 3/54* (2013.01); *B41J 3/543* (2013.01); *B41J 3/62* (2013.01)

(58) Field of Classification Search

CPC . B41J 15/16; B41J 3/4076; B41J 3/407; B41J 3/4071; B41J 3/4073; B41J 3/40731; B41J 3/40733; B41J 3/4075; B41J 3/54; B41J 3/543; B41J 3/62

See application file for complete search history.

(56) References Cited

U.S. PATENT DOCUMENTS 5,799,008 A * 8/1998 Kano ..................... G11B 23/40
2013/0057612 A1* 3/2013 Song ......................... B41J 3/543
347/85

* cited by examiner

*Primary Examiner* — Henok D Legesse

(57) ABSTRACT

Disclosed is a tape reel code spraying apparatus, including a main frame, where a supporting plate is arranged on a side of the main frame, a tape code spraying mechanism is mounted at an end of the supporting plate by means of a support, the tape code spraying mechanism is located above the end of the supporting plate, a code scanning mechanism is arranged on a side of the tape code spraying mechanism, and an orientation of the code scanning mechanism corresponds to a position of the supporting plate. When a reel is fed by means of a feeding frame, a moving mechanism drives the reel code spraying mechanism to move on the reel for code spraying, then the reel falls into a winding apparatus. The present disclosure better improves overall production efficiency of the product during use, and realizes paperless production.

4 Claims, 3 Drawing Sheets

APPARATUS FOR CODE SPRAYING ON TAPE AND REEL

TECHNICAL FIELD

The present disclosure relates to the technical field of code spraying, and in particular, to a tape reel code spraying apparatus.

BACKGROUND

Inkjet coding, or called code spraying refers to that many technologies are used to make very tiny ink droplets eject from a nozzle, and the ink droplets pass through the air and finally fall on a surface of an object subjected to jet printing to form a jet-printed pattern.

Currently, when a reel winds a tape, only the reel is wound, and the tape reel needs to be code-sprayed during processing, so that an additional device is needed for code spraying, and an additional process is required during the processing, resulting in a decrease in overall efficiency. Currently, reels all use printed paper labels, and when in use, the labels are attached to the reels before winding. Therefore, a tape reel code spraying apparatus needs to be designed to solve the above problems.

SUMMARY

An objective of the present disclosure is to provide a tape reel code spraying apparatus, to solve the problems raised in the above background.

To achieve the above objective, the present disclosure provides the following technical solution: A tape reel code spraying apparatus includes a main frame, where a supporting plate is arranged on a side of the main frame, a tape code spraying mechanism is mounted at an end of the supporting plate by means of a support, the tape code spraying mechanism is located above the end of the supporting plate, a code scanning mechanism is arranged on a side of the tape code spraying mechanism, an orientation of the code scanning mechanism corresponds to a position of the supporting plate, a feeding frame is arranged at an end of the main frame, a moving mechanism is arranged at an upper end of the main frame at a position corresponding to the feeding frame, a reel code spraying mechanism is arranged on a lower side of the moving mechanism, a position of the reel code spraying mechanism corresponds to a position of the feeding frame, the moving mechanism includes a linear guide rail fixed to the upper end of the main frame and a stepping motor mounted at an end of the linear guide rail, synchronous wheels are rotatably connected to two ends of the linear guide rail, an outer side of each of the synchronous wheels is sleeved with a synchronous belt, the reel code spraying mechanism is mounted on a lower side of the synchronous wheel, an upper end of the reel code spraying mechanism is slidably sleeved on the linear guide rail, and an output shaft of the stepping motor is fixedly connected to the synchronous wheel.

Preferably, a reel frame is arranged at the upper end of the main frame, a feeding plate is rotatably connected to a lower side of the reel frame, a feeding cylinder is arranged on a lower side of the feeding plate, and an end of the feeding cylinder is rotatably connected to the main frame.

Preferably, a positioning cylinder is arranged on a middle portion of the feeding plate, a limiting cylinder is arranged at an end of the reel frame, and a limiting insertion plate is connected to an end of the limiting cylinder.

Preferably, a pushing cylinder is rotatably connected to a lower side of the feeding frame, an upper disc frame is rotatably connected to an upper side of the feeding frame, and an end of the pushing cylinder is rotatably connected to an end of the upper disc frame.

Preferably, a guide frame is arranged at an end of the supporting plate, and a winding mechanism is provided at an end, corresponding to the supporting plate, of a side of the main frame.

Preferably, a guide plate is arranged on an upper side of the winding mechanism at a position corresponding to the feeding frame.

Compared with the prior art, the present disclosure has the following beneficial effects:

1. By providing the tape code spraying mechanism, the code scanning mechanism, the moving mechanism, the reel code spraying mechanism and a reel scanning mechanism, the tape code spraying mechanism and the code scanning mechanism are mounted on the supporting plate during use, a tape passes across the supporting plate for code spraying and scanning, and is mounted on the moving mechanism and the reel code spraying mechanism, such that when a reel is fed by means of the feeding frame, the reel is first positioned, the moving mechanism drives the reel code spraying mechanism to move on the reel for code spraying, and then the reel is mounted by the winding mechanism to scan the reel and wind the tape, without spraying a code on or attaching a label to the tape reel on another device before winding during processing, which better improves overall production efficiency of the product during use.
2. By providing the reel frame and the feeding frame, during use, the reel is limited by the limiting cylinder, and feeding and discharging are performed by rotating the feeding plate and the feeding cylinder, which better facilitates feeding of the reel.

In the figures: 1. Main frame; 2. Guide frame; 3. Supporting plate; 4. Tape code spraying mechanism; 5. Code scanning mechanism; 6. Reel frame; 7. Limiting cylinder; 8. Moving mechanism; 9. Reel code spraying mechanism; 10. Feeding frame; 11. Guide plate; 12. Winding mechanism; 13. Feeding plate; 14. Feeding cylinder; 15. Upper disc frame; 16. Pushing cylinder; 17. Synchronous wheel; 18. Linear guide rail; 19. Synchronous belt; 20. Positioning cylinder; 21. Stepping motor.

DETAILED DESCRIPTION OF THE EMBODIMENTS

The technical solutions in embodiments of the present disclosure will be described below clearly and completely with reference to the accompanying drawings in the embodiments of the present disclosure. Apparently, the described embodiments are merely some, rather than all of the embodiments of the present disclosure. All other embodiments derived from the embodiments of the present disclosure by those of ordinary skill in the art without creative efforts shall fall within the protection scope of the present disclosure.

Embodiment 1

Figure 1:
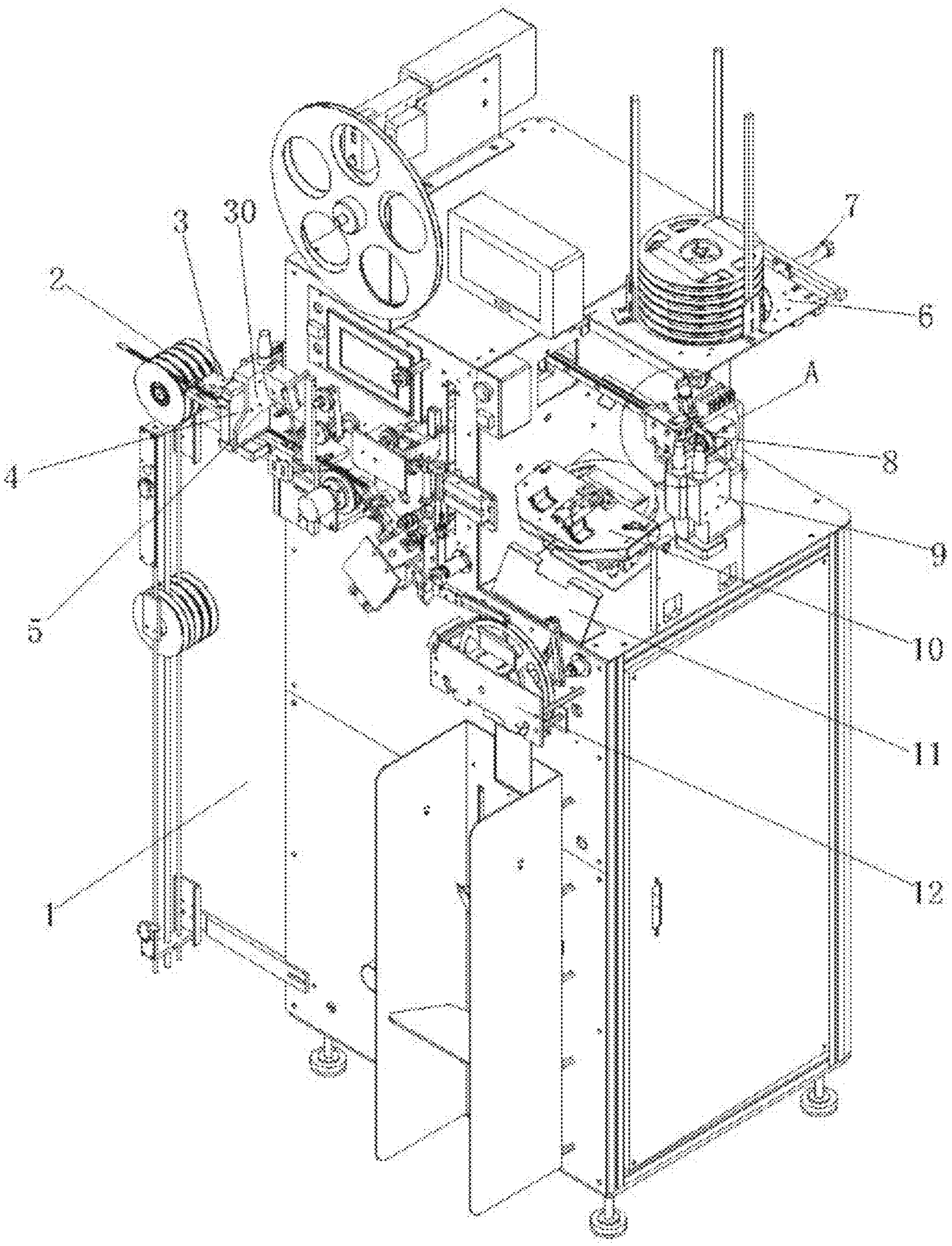
FIG. 1 is a schematic structural diagram of the present disclosure.
Figure 2:
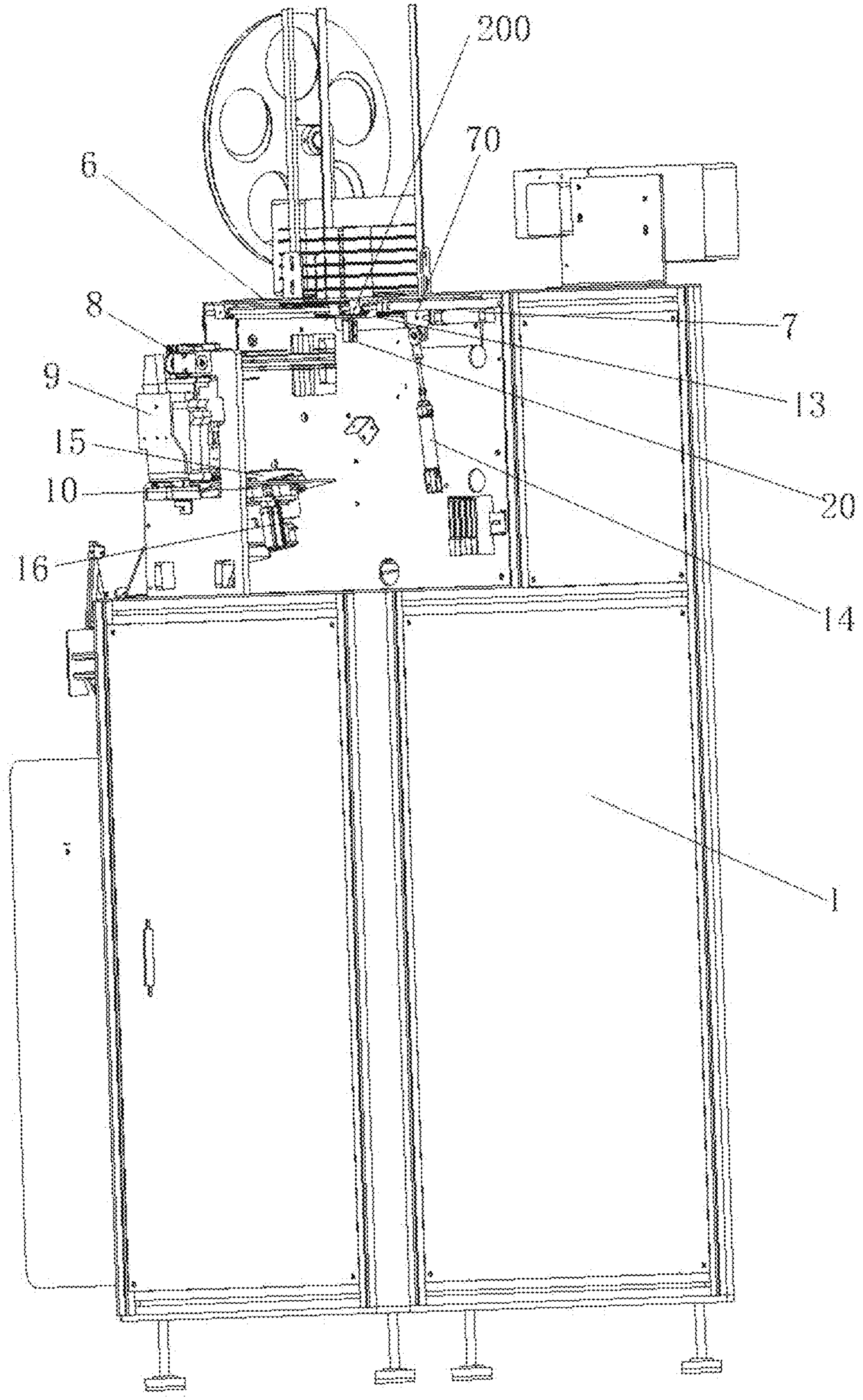
FIG. 2 is a schematic diagram of a rear side structure according to the present disclosure.
Figure 3:
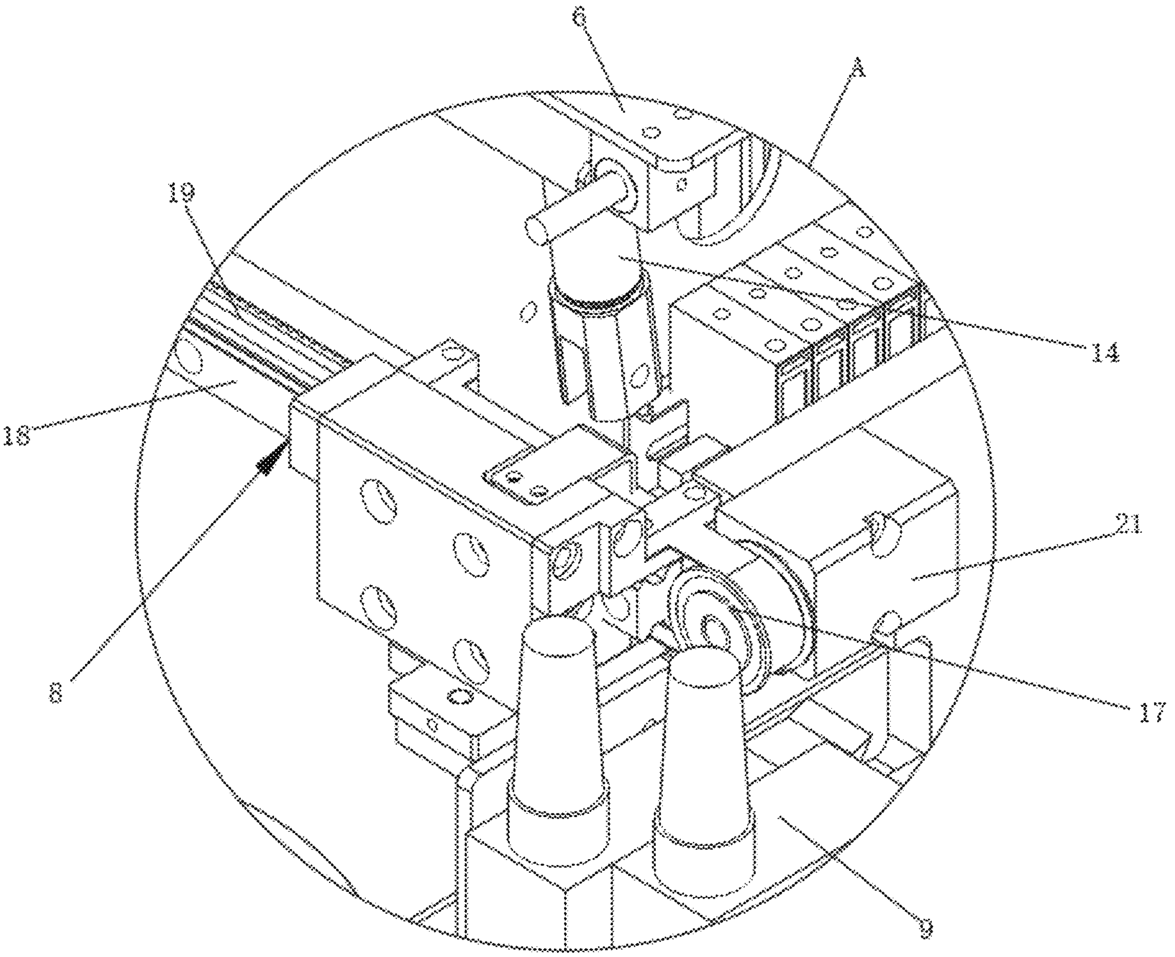
FIG. 3 is a schematic diagram of an enlarged structure of a part A of FIG. 1 according to the present disclosure.

Referring to FIGS. 1 to 3, the present disclosure provides a technical solution: A tape reel code spraying apparatus includes a main frame 1, where a supporting plate 3 is arranged on a side of the main frame 1, a tape code spraying mechanism 4 is mounted at an end of the supporting plate 3 by means of a support, the tape code spraying mechanism 4 is located above the end of the supporting plate 3, a code scanning mechanism 5 is arranged on a side of the tape code spraying mechanism 4, and an orientation of the code scanning mechanism 5 corresponds to a position of the supporting plate 3. A tape moves on the supporting plate 3 by means of a pin wheel apparatus, and the tape code spraying mechanism 4 and the code scanning mechanism 5 spray codes on and scan the tape. A reel positioning apparatus 10 is arranged at an end of the main frame 1, a moving mechanism 8 is arranged at an upper end of the main frame 1 at a position corresponding to the reel positioning apparatus 10, a reel code spraying mechanism 9 is arranged on a lower side of the moving mechanism 8, a position of the reel code spraying mechanism 9 corresponds to a position of the reel positioning apparatus 10, the moving mechanism 8 includes a linear guide rail 18 fixed to the upper end of the main frame 1 and a stepping motor 21 mounted at an end of the linear guide rail 18, synchronous wheels 17 are rotatably connected to two ends of the linear guide rail 18, an outer side of each of the synchronous wheels 17 is sleeved with a synchronous belt 19, the reel code spraying mechanism 9 is mounted on a lower side of the synchronous wheel 17, an upper end of the reel code spraying mechanism 9 is slidably sleeved on the linear guide rail 18, and an output shaft of the stepping motor 21 is fixedly connected to the synchronous wheel 17. The stepping motor 21 drives the synchronous wheel 17 and the synchronous belt 19 to rotate, thereby driving the reel code spraying mechanism 9 to move along the linear guide rail 18. In addition, the synchronous belt 19 sprays a code on a surface of the reel on an upper disc frame 15. A guide frame 2 is arranged at an end of the supporting plate 3, and a winding mechanism 12 is provided at an end, corresponding to the supporting plate 3, of a side of the main frame 1. An end of the tape is wound around the reel in the winding mechanism 12, and a reel code spraying and scanning apparatus is arranged on an inner side of the winding mechanism 12.

It can be seen from the above description that the present disclosure has the following beneficial effects: During use, by mounting the tape code spraying mechanism 4 and the code scanning mechanism 5 on the supporting plate 3, the tape passes across the supporting plate 3 for code spraying and scanning, and is mounted on the moving mechanism 8 and the reel code spraying mechanism 9, such that when the reel is fed by means of the reel positioning apparatus 10, the moving mechanism 8 drives the reel code spraying mechanism 9 to move on the reel for code spraying, and then the reel is mounted by the winding mechanism 12 to wind the tape, without spraying a code on the tape reel on another device before winding during processing, which better improves overall production efficiency of the product during use.

Embodiment 2

Referring to FIGS. 1 to 3, based on Embodiment 1, the present disclosure provides a technical solution: A reel frame 6 is arranged at the upper end of the main frame 1, a feeding plate 13 is rotatably connected to a lower side of the reel frame 6, a feeding cylinder 14 is arranged on a lower side of the feeding plate 13, and an end of the feeding cylinder 14 is rotatably connected to the main frame 1. A positioning cylinder 20 is arranged on a middle portion of the feeding plate 13, a limiting cylinder 7 is arranged at an end of the reel frame 6, and a limiting insertion plate is connected to an end of the limiting cylinder 7. The positioning cylinder 20 drives a piston rod to slide out of a middle portion of the reel, so that the reel slides down from the feeding plate 13, and the reel sliding down is received by the upper disc frame 15. A pushing cylinder 16 is rotatably connected to a lower side of the reel positioning apparatus 10, the upper disc frame 15 is rotatably connected to an upper side of the reel positioning apparatus 10, and an end of the pushing cylinder 16 is rotatably connected to an end of the upper disc frame 15, and can rotate horizontally by 180°, so that the reel can be placed down to the winding mechanism with the front forward or the back forward. The pushing cylinder 16 drives the upper disc frame 15 to tilt so that the reel falls into the winding mechanism 12. A guide plate 11 is arranged on an upper side of the winding mechanism 12 at a position corresponding to the reel positioning apparatus 10, thereby facilitates the sliding of the reel into the winding mechanism 12.

By using the reel frame 6 and the reel positioning apparatus 10 of the above technical solution, during use, the reel is limited by the limiting cylinder 7, and feeding and discharging are performed by rotating the feeding plate 13 and the feeding cylinder 14, which better facilitates feeding of the reel.

The working principle and use flow of the present disclosure are as follows: During use, reels are stacked on the reel frame 6, the limiting insertion plate 70 on the piston rod 200 at an end of the limiting cylinder 7 is inserted into the second reel at the bottom for limiting, and the piston rod 200 of the positioning cylinder 20 is inserted into the middle portion of the first reel at the bottom; during feeding, the feeding cylinder 14 drives the feeding plate 13 to rotate and tilt, and the positioning cylinder 20 drives the piston rod 200 to slide out from the middle portion of the reel, so that the reel slides down from the feeding plate 13, the reel sliding down is received by the upper disc frame 15, and then the stepping motor 21 drives the synchronous wheel 17 and the synchronous belt 19 to rotate, thereby driving the reel code spraying mechanism 9 to move along the linear guide rail 18; in addition, the synchronous belt 19 sprays a code on the surface of the reel on the upper disc frame 15, and then the pushing cylinder 16 drives the upper disc frame 15 to tilt so that the reel falls into the winding mechanism 12; the tape moves on the supporting plate 3 by means of a synchronous apparatus, i.e., the synchronous wheels 17 and the synchronous belt 19, the tape code spraying mechanism 4 and the code scanning mechanism 5 spray a code on and scan the tape, and then an end of the tape is wound around the reel in the winding mechanism 12.

It should be noted that relational terms herein such as first and second are merely used to distinguish one entity or operation from another entity or operation without necessarily requiring or implying any actual such relationship or order between such entities or operations. In addition, terms “include”, “comprise”, or any other variations thereof are intended to cover a non-exclusive inclusion, so that a process, a method, an article, or a device including a series of elements not only includes those elements, but also includes other elements that are not explicitly listed, or also includes inherent elements of the process, the method, the article, or the device. Without more restrictions, the elements defined by the sentence “including a . . . ” do not exclude the existence of other identical elements in a process, method, article, or device including the elements.

The above described are merely intended to illustrate the technical solutions of the present disclosure, rather than to construct a limitation thereto. Other modifications or equivalent replacements made to the technical solutions of the present disclosure by those of ordinary skill in the art should fall within the scope defined by the claims of the present disclosure provided that they do not depart from the spirit and scope of the technical solutions of the present disclosure.

What is claimed is:

1. A tape reel code spraying apparatus, comprising: a main frame (1), wherein a supporting plate (3) is arranged on a side of the main frame (1), a tape code spraying mechanism (4) is mounted at an end of the supporting plate (3) by means of a support (30), the tape code spraying mechanism (4) is configured to spray a code associated with a tape on the tape, a code scanning mechanism (5) is arranged on a side of the tape code spraying mechanism (4), an orientation of the code scanning mechanism (5) corresponds to a position of the supporting plate (3), a feeding frame (10) is arranged at an end of the main frame (1), a moving mechanism (8) is arranged at an upper end of the main frame (1) at a position corresponding to the feeding frame (10), a reel code spraying mechanism (9) is arranged on a lower side of the moving mechanism (8), the reel code spraying mechanism (9) is configured to spray a code associated with a reel on the reel, a position of the reel code spraying mechanism (9) corresponds to a position of the feeding frame (10), the moving mechanism (8) comprises a linear guide rail (18) fixed to the upper end of the main frame (1) and a stepping motor (21) mounted at an end of the linear guide rail (18), synchronous wheels (17) are rotatably connected to two ends of the linear guide rail (18), an outer side of each of the synchronous wheels (17) is sleeved with a synchronous belt (19), the reel code spraying mechanism (9) is mounted on a lower side of the synchronous wheel (17), an upper end of the reel code spraying mechanism (9) is slidably sleeved on the linear guide rail (18), and an output shaft of the stepping motor (21) is fixedly connected to the synchronous wheel (17);

wherein a reel frame (6) is arranged at the upper end of the main frame (1), a feeding plate (13) is rotatably connected to a lower side of the reel frame (6), a feeding cylinder (14) is arranged on a lower side of the feeding plate (13), and an end of the feeding cylinder (14) is rotatably connected to the main frame (1);

wherein a positioning cylinder (20) is arranged on a middle portion of the feeding plate (13), a limiting cylinder (7) is arranged at an end of the reel frame (6), and a limiting insertion plate (70) is connected to an end of the limiting cylinder (7).

2. The tape reel code spraying apparatus according to claim 1, wherein a guide frame (2) is arranged at an end of the supporting plate (3), and a winding mechanism (12) is provided at an end, corresponding to the supporting plate (3), of a side of the main frame (1).

3. The tape reel code spraying apparatus according to claim 2, wherein a guide plate (11) is arranged on an upper side of the winding mechanism (12) at a position corresponding to the feeding frame (10).

4. The tape reel code spraying apparatus according to claim 1, wherein the positioning cylinder (20) comprises a piston rod (200).

* * * * *